United States Patent
Danilov et al.

(10) Patent No.: US 10,698,630 B2
(45) Date of Patent: Jun. 30, 2020

(54) INTRA-CLUSTER MIGRATION FOR ELASTIC CLOUD STORAGE DEVICES

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 16/007,419

(22) Filed: Jun. 13, 2018

(65) Prior Publication Data
US 2019/0384519 A1  Dec. 19, 2019

(51) Int. Cl.
*G06F 12/00* (2006.01)
*G06F 3/06* (2006.01)

(52) U.S. Cl.
CPC .......... *G06F 3/0647* (2013.01); *G06F 3/0604* (2013.01); *G06F 3/064* (2013.01); *G06F 3/067* (2013.01); *G06F 3/0631* (2013.01)

(58) Field of Classification Search
None
See application file for complete search history.

(56) References Cited

U.S. PATENT DOCUMENTS

| | | | | |
|---|---|---|---|---|
| 8,156,306 B1* | 4/2012 | Raizen | ................. | G06F 3/0608 707/813 |
| 8,239,621 B2* | 8/2012 | Yamato | ................. | G06F 16/10 711/114 |
| 9,477,407 B1* | 10/2016 | Marshak | ................. | G06F 3/061 |
| 9,733,844 B2* | 8/2017 | Gong | ................. | G06F 3/0616 |
| 10,235,053 B1* | 3/2019 | Derbeko | ................. | G06F 3/0611 |
| 10,521,119 B1 | 12/2019 | Danilov et al. | | |
| 2010/0070466 A1* | 3/2010 | Prahlad | ................. | G06F 3/0605 707/609 |
| 2014/0297964 A1* | 10/2014 | Nakase | ................. | G06F 12/1054 711/136 |
| 2017/0024161 A1* | 1/2017 | Katiyar | ................. | G06F 3/0647 |
| 2017/0031710 A1* | 2/2017 | Kuik | ................. | G06F 9/4856 |
| 2017/0147227 A1* | 5/2017 | Stabrawa | ................. | G06F 3/0667 |
| 2017/0177652 A1 | 6/2017 | Danilov et al. | | |
| 2017/0285952 A1 | 10/2017 | Danilov et al. | | |
| 2018/0165190 A1 | 6/2018 | Danilov et al. | | |

(Continued)

OTHER PUBLICATIONS

Non-Final Office Action received for U.S. Appl. No. 16/007,419 dated Mar. 5, 2020, 51 pages.

*Primary Examiner* — John A Lane
(74) *Attorney, Agent, or Firm* — Amin, Turocy & Watson, LLP

(57) ABSTRACT

Facilitating intra-cluster migration of data in an elastic cloud storage environment is provided herein. A system can comprise a processor and a memory that stores executable instructions that, when executed by the processor, facilitate performance of operations. The operations can comprise scheduling a migration of a data chunk from a source storage node to a target storage node. Further, the operations can comprise facilitating the migration of the data chunk from a first location in the source storage node to a second location in the target storage node. Data indicative of an identity of the data chunk can be migrated with the data chunk. The operations can also comprise replacing the first location with the second location in a storage mapping table.

20 Claims, 11 Drawing Sheets

(56) References Cited

U.S. PATENT DOCUMENTS

| | | |
|---|---|---|
| 2018/0181487 A1 | 6/2018 | Danilov et al. |
| 2019/0155922 A1* | 5/2019 | Kim ..................... G06F 3/0643 |
| 2019/0171577 A1* | 6/2019 | Arcangeli ........... G06F 12/1009 |
| 2019/0213175 A1* | 7/2019 | Kong .................... G06F 16/214 |
| 2019/0258586 A1* | 8/2019 | Beaverson ............ G06F 3/0604 |
| 2019/0303035 A1 | 10/2019 | Danilov et al. |
| 2019/0384519 A1 | 12/2019 | Danilov et al. |

* cited by examiner

INTRA-CLUSTER MIGRATION FOR ELASTIC CLOUD STORAGE DEVICES

TECHNICAL FIELD

The subject disclosure relates generally to data storage. More specifically, the subject disclosure relates to data storage for elastic cloud storage devices.

BACKGROUND

Distributed storage systems and/or object storage systems can provide a wide range of storage services while achieving high scalability, availability, and serviceability. An example of such storage systems is referred to as Elastic Cloud Storage (ECS), which uses the latest trends in software architecture and development to achieve the above noted services, as well as other services.

To move data between storage devices, the data has been traditionally moved at an object level. However, ECS operates at a chunk level, not an object level. Therefore, when data is moved in an ECS at an object level, repeated replication of an entire data set is necessary. Further, a complete rebuild of the largest Data Table (DT), such as an Object Table, is also necessary, which can provide a large amount of garbage that needs to be collected. Accordingly, unique challenges exist to provide performance and processing efficiency for migration of data retained in storage devices of an ECS system.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In one embodiment, provided herein is a method that can comprise determining, by a system comprising a processor, that a data chunk of a first storage device is scheduled to be migrated to a second storage device. The method can also comprise moving, by the system, the data chunk, a coding location associated with the data chunk, and a chunk identifier associated with the data chunk from a first block at the first storage device to a second block at the second storage device. Further, the method can comprise updating, by the system, a storage reference data structure with the chunk identifier and an indication of a location of the second block. The first storage device and the second storage device can be geographically distributed devices.

In an example, the indication of the location of the second block is a first indication of a first location of the second block. Further to this example, the method can comprise removing, by the system, a second indication of a second location of the first block from the storage reference data structure. The first indication of the first location can be a location of the second block in the second storage device. Further, the second indication of the second location of the first block can be a previous location of the first block in the first storage device.

In another example, the method can comprise, prior to moving the data chunk, dividing, by the system, a capacity of the second storage device into a set of free blocks. The set of free blocks can comprise the second block. According to another example, the method can comprise, prior to moving the data chunk, determining, by the system, that the data chunk comprises immutable data.

According to some implementations, the method can comprise, prior to moving the data chunk, determining, by the system, the data chunk is open for writes at the first storage device. Further to these implementations, prior to moving the data chunk, the method can comprise adding, by the system, a reference of the data chunk to a backlog data structure and forcing, by the system, a closure of the data chunk at the first storage device based on another determination, after a defined interval, that the data chunk is still open for writes at the first storage device.

According to some implementations, moving the data chunk and the chunk identifier can comprise eliminating repeated replication of the data chunk. In accordance with some implementations, moving the data chunk and the chunk identifier can comprise preserving locations of existing objects at the first storage device.

The method, prior to moving the data chunk, can comprise calculating, by the system, a first amount of used capacity in the first storage device. Further to these implementations, the method can comprise reserving, by the system, a second amount of capacity in the second storage device. The first amount of used capacity and the second amount of capacity can be a similar amount of capacity as determined by a similarity criterion.

Further, in some implementations, prior to moving the data chunk, the method can comprise recovering, by the system, a consistency of the data chunk based on a first determination that the data chunk is not consistent. The method can also comprise allocating, by the system, an amount of available space in the second storage device and approving, by the system, a movement of the data chunk based on a second determination that the amount of available space allocated in the second storage device is at a sufficient level to accommodate the data chunk.

Another embodiment relates to a system that can comprise a processor and a memory that stores executable instructions that, when executed by the processor, facilitate performance of operations. The operations can comprise scheduling a migration of a data chunk from a source storage node to a target storage node. Further, the operations can comprise facilitating the migration of the data chunk from a first location in the source storage node to a second location in the target storage node. Data indicative of an identity of the data chunk can be migrated with the data chunk. The operations can also comprise replacing the first location with the second location in a storage mapping table. The source storage node and the target storage node can be storage devices of an elastic cloud storage system.

In an example, replacing the first location with the second location can comprise removing a first reference to the first location for the identity of the data chunk from the storage mapping tab. Further, a second reference can be added to the second location for the identity of the data chunk to the storage mapping table.

In some implementations, the operations can comprise, prior to facilitating the migration of the data chunk, dividing a storage capacity of the target storage node into a set of free blocks. The first location can be included in a block of the set of free blocks. According to some implementations, the operations can comprise, prior to facilitating the migration of the data chunk, determining the data chunk is sealed and comprises immutable data.

The operations can comprise, prior to facilitating the migration of the data chunk, performing a first determination that the data chunk is open for writes at the source storage node. Further, the operations can comprise performing a second determination that the data chunk is open for writes at the source storage node after a defined interval measured from the first determination and causing, at the source storage node, a forced closure of the data chunk based on the second determination.

In some implementations, the operations can further comprise facilitating a processing efficiency based on the migration of the data chunk and data indicative of the identity of the data chunk at a chunk level as compared to movement of data at an object level.

Another embodiment relates to a computer-readable storage medium comprising instructions that, in response to execution, cause a system comprising a processor to perform operations. The operations can comprise determining a data chunk is to be migrated from a first storage node device to a second storage node device. The operations can also comprise moving the data chunk and information indicative of an identity of the data chunk from a first block of the first storage node device to a second block of the second storage node device. Further, the operations can comprise updating a location of the data chunk in a chunk manager data structure from the first block to the second block.

According to an implementation, the operations can comprise preserving locations of existing objects at the first storage node device after moving the data chunk. Further, in some implementations, the operations can comprise eliminating repeated replication of the data chunk based on a movement of the data chunk and information indicative of the identity of the data chunk from the first block to the second block.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
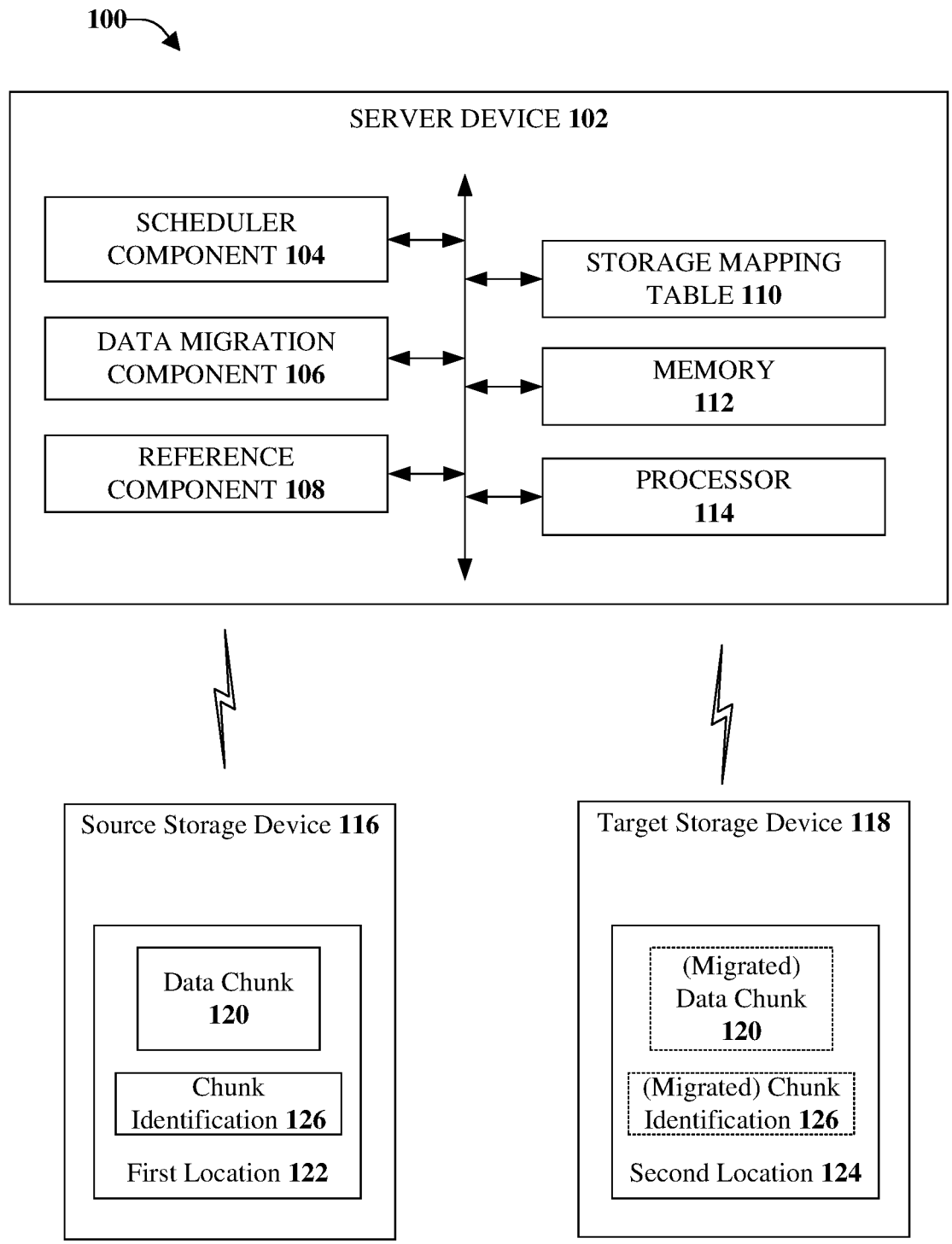
FIG. 1 illustrates an example, non-limiting, system for intra-cluster migration for elastic cloud storage in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Elastic Cloud Storage (ECS) uses cutting-edge technology to implement many of its functions. In particular, ECS uses a specific method for disk capacity management and does not solely rely on a file system. The disk space is partitioned into a set of blocks of fixed size, referred to as "chunks." All the information, user data, and different kinds of metadata, are stored in these chunks. Further, chunk content is modified in append-only mode. When a chunk becomes full (e.g., based on a defined used amount of space), the chunk is sealed. Content of a sealed chunk is immutable.

There are different types of chunks, one type per capacity user. In particular, user data is stored in repository chunks (or simply repo chunks). The metadata is stored in tree-like structures, referred to as "tree chunks." Chunks of the one or more types (e.g., repo chunks and tree chunks) are shared. For example, a repo chunk can contain segments of several user objects and a tree chunk can contain elements of several trees.

ECS runs a set of storage services, which together implement business logic of storage, which is referred to as "blob service." Blob service maintains an object table that keeps track of all objects in the system. In particular, the object table contains location information for the objects. There is also a chunk manager service that maintains a chunk table. As indicated by its name, ECS is a cloud storage. The corresponding feature is called GEO since ECS supports geographically distributed setups consisting of two or more zones.

ECS is a hardware appliance product and products of this type sooner or later face the problem of hardware upgrade (e.g., change of generation). In some cases, legacy data is moved from old nodes to new nodes at the object level. This approach is simple and practical to implement, however, for ECS this approach to movement of legacy data requires repeated replication of an entire data set since replication in ECS works at the chunk level. In addition, this type of implementation would require complete rebuild of the largest DT (e.g., Object Table). This approach would produce a huge amount of garbage to collect for a slow garbage collector. Accordingly, the various aspects provided herein implement ICM at the chunk level. When a chunk is moved from old nodes to new nodes, the chunk can preserve its chunk ID. Preservation of the chunk content and the chunk ID allows for the elimination of repeated replication of the data. In addition, such a move allows that the location of existing objects does not need to be updated. It is noted that BS (Blob Service) keeps track of not physical but logical objects' locations. Each particular object segment is addressed relative to a chunk, identified with its chunk ID.

FIG. 1 illustrates an example, non-limiting, system 100 for intra-cluster migration for elastic cloud storage in accordance with one or more embodiments described herein. The system 100 (as well as other systems discussed herein) can be implemented as a storage system that supports intra-cluster migration (e.g., an elastic cloud storage). Thus, the system 100 can facilitate the migration of data across geographically distributed systems that comprise two or more zones.

The system 100 (and other systems discussed herein) can facilitate intra-cluster migration, which can increase a resource efficiency of a hardware upgrade. Namely, the various aspects provided herein can allow the avoidance of repeated data replication and creation of a large quantity of garbage.

The system 100 can include a server device 102 that can perform data migration between different storage zones as discussed herein. The server device 102 can include a scheduler component 104, a data migration component 106, a reference component 108, a storage mapping table 110, at least one memory 112, and at least one processor 114. According to some implementations, the storage mapping table 110 can be included, at least partially, in the at least one memory 112.

The server device 102 can interact with a first storage device (e.g., a source storage device 116) and at least a second storage device (e.g., a target storage device 118). The source storage device 116 and the target storage device 118 can be geographically distributed devices. In an example, the source storage device 116 can be located in a first zone and the target storage device 118 can be located in a second zone. It is noted that although the various aspects are discussed with respect to two storage devices, migration between more than two storage devices can be facilitated with the disclosed aspects.

In some implementations, the storage devices (e.g., the source storage device 116, the target storage device 118, and subsequent storage devices) can be referred to as geographically distributed setups or zones (e.g., a first zone, a second zone, and/or subsequent zones). Further, although the server device 102 is illustrated and described as a component separate from the source storage device 116 and the target storage device 118, the server device 102 can be included, at least partially, in the source storage device 116 and/or the target storage device 118. In some implementations, the storage devices can include the functionality of the server device. For example, the source storage device 116 can include a first server device (that includes the functionality of the server device 102) and the target storage device 118 can include a second server device (that includes the functionality of the server device 102). Accordingly, the first server device and the second server device can be in communication with one another, but can operate independently from one another.

As used herein, the term "storage device," "first storage device," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device). A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a Storage Attached Network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

The scheduler component 104 can determine that a data chunk 120 is to be moved from the source storage device 116 (e.g., a source storage node, a source storage node device) to the target storage device 118 (e.g., a target storage node, a target storage node device). For example, the scheduler component 104 can determine that the source storage device 116 is to be replaced, at least partially, with the target storage device 118. Therefore, at least a portion of the data stored in the source storage device 116 should be moved to the target storage device 118.

The data migration component 106 can facilitate the migration of the data chunk 120 from a first location 122 in the source storage device 116 to a second location 124 in the target storage device 118. Data indicative of an identity of the data chunk (e.g., chunk identification 126) can be migrated at substantially the same time as the data chunk 120 is migrated from the source storage device 116 to the target storage device 118.

The storage mapping table 110 can include a mapping or cross reference between a data chunk and its storage location. Therefore, a location of the data chunk 120 stored within the storage mapping table 110 can be updated, by the reference component 108, upon or after the data chunk 120 is migrated from the source storage device 116 to the target storage device 118. For example, a mapping indicating the data chunk 120 is stored at the first location 122 can be replaced with another mapping indicating the data chunk 120 is stored at the second location 124.

According to some implementations, the reference component 108 can also update a mapping of a first reference to the first location 122 for the identity of the data chunk (e.g., the chunk identification 126) from the storage mapping table 110. Further, the reference component 108 can add the second reference to the second location 124 for the identity of the data chunk (e.g., the chunk identification 126) to the storage mapping table 110.

In further detail, the disclosed aspects provide intra-cluster migration for ECS, which does not employ traditional monolithic storage architecture. ECS applies some key elements of Microservice Architecture pattern. According to this pattern, complex software systems are composed of rather small and highly decoupled processes called microservices. The processes are called microservices because each of the processes is small and narrowly focused on doing a single small task. In real life it is almost impossible to implement a system as a set of absolutely independent processes. Therefore, microservices communicate with each other using language-agnostic APIs.

In some cases, the storage devices (e.g., the source storage device 116 and the target storage device 118) can be included in respective storage clusters, which can include one or more services and/or one or more storage devices. In some embodiments, a storage device can comprise various services including: an authentication service to authenticate requests, storage APIs to parse and interpret requests, a storage chunk management service to facilitate storage chunk allocation/reclamation for different storage system needs and monitor storage chunk health and usage, a storage server management service to manage available storage devices capacity and to track storage devices states, and a storage server service to interface with the storage devices.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

With continuing reference to the server device 102, the at least one memory 112 can be operatively coupled to the at least one processor 114. The at least one memory 112 can store protocols associated with facilitating migration of data in a data storage environment as discussed herein. Further, the at least one memory 112 can facilitate actions to control communication between the server device 102 and the one or more storage devices (e.g., the source storage device 116, the target storage device 118), such that the system 100 can employ stored protocols and/or algorithms to achieve improved storage management through data migration as described herein.

It should be appreciated that data store components (e.g., memories) described herein can be either volatile memory, nonvolatile memory, or can include both volatile and non-volatile memory. By way of example and not limitation, nonvolatile memory can include Read Only Memory (ROM), Programmable ROM (PROM), Electrically Programmable ROM (EPROM), Electrically Erasable ROM (EEPROM), or flash memory. Volatile memory can include Random Access Memory (RAM), which acts as external cache memory. By way of example and not limitation, RAM is available in many forms such as synchronous RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 114 can facilitate processing data related to data migration as discussed herein. The at least one processor 114 can be a processor dedicated to analyzing and/or generating information received, a processor that controls one or more components of the system 100, and/or a processor that both analyzes and generates information received and controls one or more components of the system 100.

Figure 2:
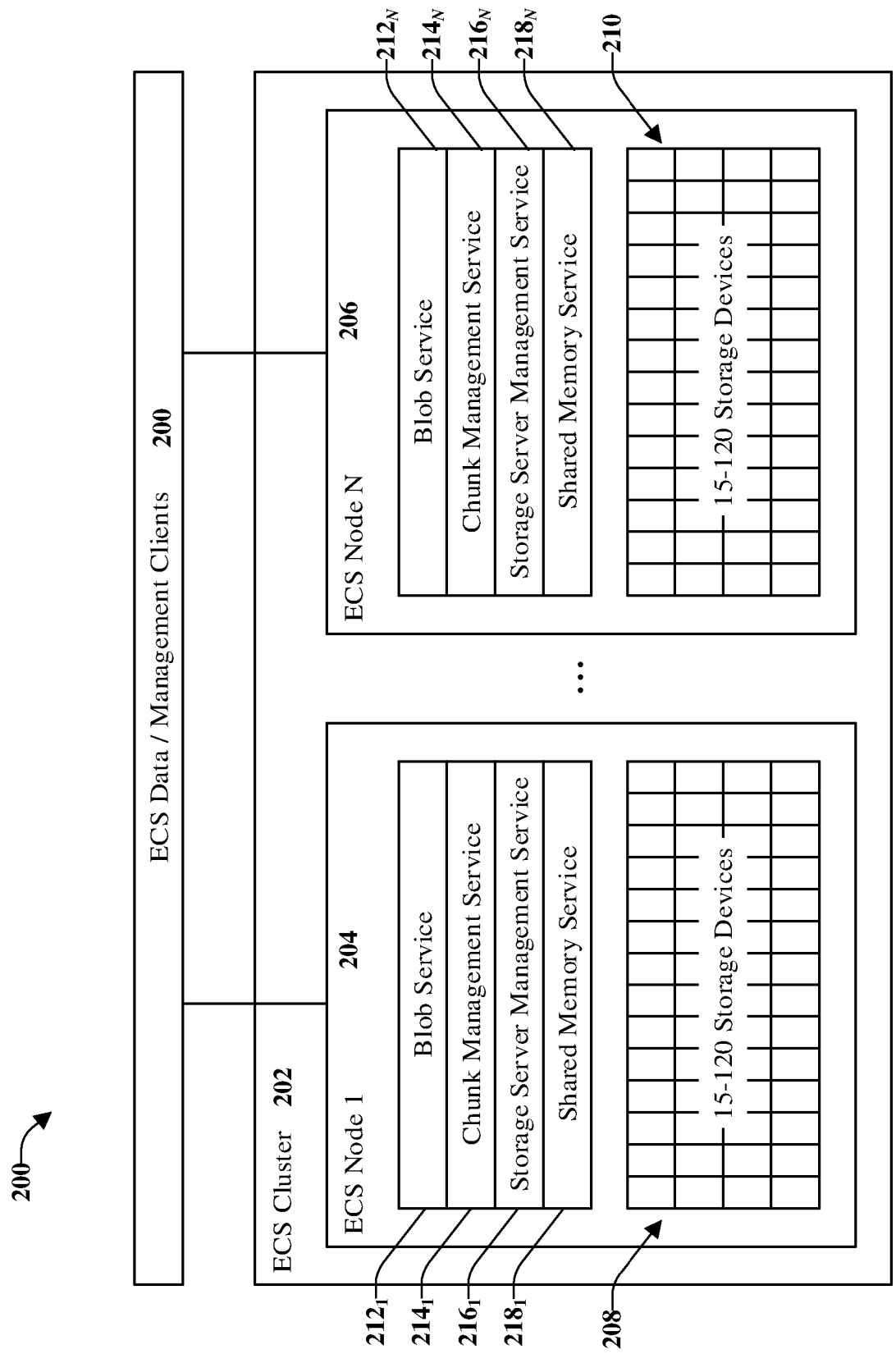
FIG. 2 illustrates a high-level architecture of elastic cloud storage in accordance with one or more embodiments described herein.

FIG. 2 illustrates a high-level architecture of ECS in accordance with one or more embodiments described herein. ECS data/management clients 200 can be serviced by an ECS cluster 202 that can comprise several (N) nodes, illustrated as a first ECS Node 204 (or ECS Node 1) through a Nth ECS Node 206 (or ECS Node N), where N is an integer. The nodes (e.g., the first ECS Node 204 through the Nth ECS Node 206) can manage several storage devices (e.g. hard drives), illustrated as a first set of storage devices 208 and a Nth set of storage devices 210. It is noted that a single ECS node can manage from around fifteen to about one hundred and twenty storage devices, for example.

The ECS nodes (e.g., the first ECS Node 204, the Nth ECS Node 206) can run a number of services. In FIG. 2 only four service blocks are illustrated for purposes of simplicity. In reality, a single node that runs ECS can manage about twenty (or more) independent services. For purposes of describing the one or more aspects, the illustrated services are a blob service 212, a chunk management service 214, a storage server management service 216, and a shared memory service 218.

The blob service 212 (e.g., Blob Service (BS)) can keep track of all objects in the system. For the chunk management service 214 (e.g., Chunk Manager (CM)), all disk space in ECS is partitioned into a set of blocks of fixed size called chunks. All the information, user data and a variety of metadata, is stored in these chunks. Chunks are shared. The chunks can be modified in append-only mode and once a chunk is full enough it becomes immutable. CM is the service that manages chunks. The storage server management service 216 (e.g., Storage Service Manager (SSM)) keeps track of free and used capacity blocks. Further the shared memory service 218 (e.g., Shared Memory Service (also referred to as VNest)) can guarantee a single view on cluster-level data for all cluster nodes. VNest guarantees that at least V nodes (normally five) called members share the same view on the cluster state.

ECS does not use traditional databases to store metadata and system data. Instead, ECS uses a homemade search tree implementation to store the metadata and system data. Storage services can maintain one or multiple Directory Tables (DT), where a DT is a union of around one hundred and twenty-eight search trees (also referred to as partitions). Ownership over partitions is more or less evenly distributed among cluster nodes. For example, BS maintains Object Table (OT), CM maintains Chunk Table (CT), SSM maintains SSM Table (SSMT).

As mentioned, ECS is a hardware appliance product and products of this type sooner or later face the problem of hardware upgrade (e.g., change of generation). When the product is moved to a different hardware (e.g., moved between storage devices, moved from old nodes to new nodes), the hardware upgrade should be seamless. That is, there should be no disruption of service and there should be no severe performance degradation. The disclosed aspects provide for the seamless upgrade of ECS cluster hardware.

Figure 3:
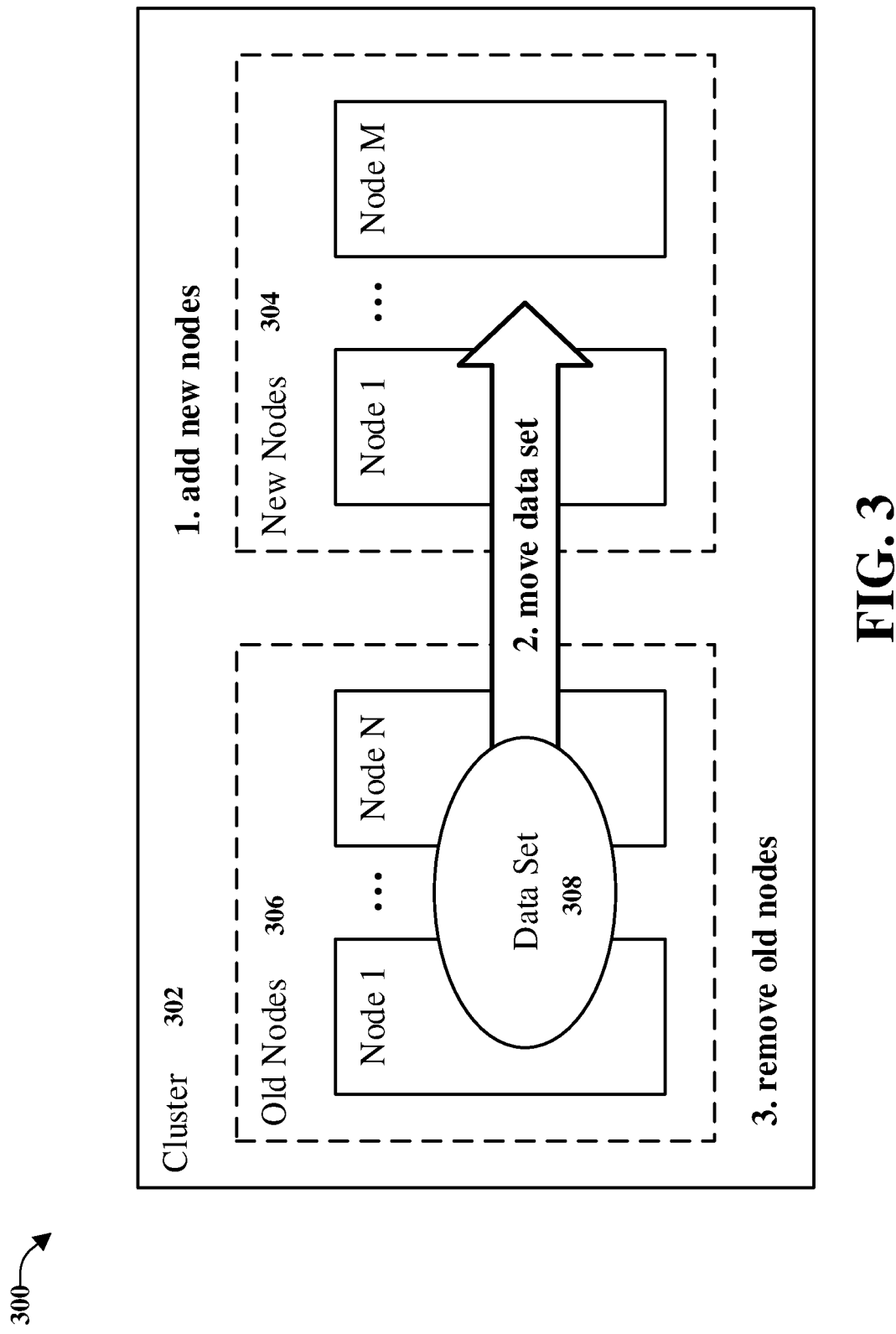
FIG. 3 illustrates a system for intra-cluster migration in accordance with one or more embodiments described herein.

FIG. 3 illustrates a system 300 for intra-cluster migration in accordance with one or more embodiments described herein. Repetitive description of like elements employed in other embodiments described herein is omitted for sake of brevity. The system 300 can comprise one or more of the components and/or functionality of the system 100, and vice versa.

The various aspects described herein can seamlessly upgrade ECS cluster hardware 302. The various aspects are based on a three-step approach for hardware upgrade, referred to as Intra-Cluster Migration (ICM). The process of ICM can include, adding a new set of nodes (e.g., new nodes 304) to a cluster of old nodes 306. For example, the set of new nodes 304 can be next generation (next Gen) nodes (e.g., the target storage device 118) and can be added to the cluster of old nodes 306, which can be previous generation (prev Gen) nodes (e.g., the source storage device 116). As illustrated, the set of old nodes 306 can comprise a first node (Node 1) through a Nth node (Node N), where N is an integer. Further, the set of new nodes 304 can comprise a first node (Node 1) through an Mth node (Node M), where M is an integer).

Upon or after addition of the new nodes 304, a data set 308 (e.g., the data chunk 120) can be moved from the old nodes 306 to the new nodes 304. Upon or after movement of the data set 308, the set of old nodes 306 can be removed from the cluster.

In further detail, new nodes can be physically added to a cluster and switched to an operation mode. The ECS platform can prepare the new storage devices and can start the storage services. The new storage services can join the old storage services to form a single cluster. Further, the new storage service can partition all DTs, such that the DTs are evenly distributed between the old nodes and the new nodes. This can assist with leveling the workload and reducing the negative effect of data move.

A shared memory service can incrementally (e.g., in several steps) make the new nodes members at the expense of the old members. This process should not take much time. The SSM can divide capacity of the new storage devices into a set of free blocks and adds them to SSM. Further, the SSM can switch the old storage devices to no-write mode. This can prevent allocation of new free blocks on the old storage devices. From this moment all new chunks can obtain capacity from the new storage devices only. Chunks that reside on the old storage devices but are still open for writes can still accept new data until the chunks are full. Free blocks on the old storage devices can be deleted from SSMT right away. Note that information about blocks still occupied by chunks should remain in SSMT to assure consistency between SSMT and CT (Chunk Table).

In an optional implementation, the SSM can calculate the amount of used capacity in the old storage devices and can reserve the same amount of free capacity in the new storage devices. Capacity for chunk moves can be allocated from this reservation. Capacity for new chunks can be allocated from outside this reservation. This can help to avoid a situation when a migration process gets stuck in the middle because there is not enough free capacity available.

It is noted that the above steps are preparatory. After they are completed, the CM can perform actual data move from the old nodes to the new nodes. To do this the CM can iterate over CT and handle each chunk, which will now be described. If the chunk resides in the new nodes, then there is no further action necessary. If the chunk resides in the old nodes but is still open for new writes, then the chunk can be added to the backlog and processed later.

Alternatively, if the chunk resides in the old nodes and the chunk is immutable already (sealed), then CM can check the health/consistency of the chunk and recover the chunk if needed. Further, the CM can allocate free capacity in the new nodes. The data (and the coding data) can be moved to the new location. The CM can also update the CT so that the chunk with the chunk ID references the new location. In addition, the CM can notify the SSM so that the SSM can update the SSMT accordingly. The old block occupied by the chunk can be permanently removed from SSMT.

Further, the CM can reiterate the chunks from the backlog. The CM can force chunks closed. For example, if a chunk is open for writes for any reason, the CM can force the chunk to close and not be available for new writes.

The CM (or a dedicated service) can wait until the migration process is completed. The migration process is completed when all VNest members are new nodes and/or the CM has moved all the chunks. The process is also completed when the old nodes are shut down (taken out of service) and/or physically removed. In some cases, the process is completed when all the new storage services rebalance partitions of all DTs. Further, the process is complete when the hardware upgrade is completed.

In some cases, a throttling can be implemented in order to keep the workload produced by ICM under control so performance characteristics of the storage system are not impacted.

Figure 4:
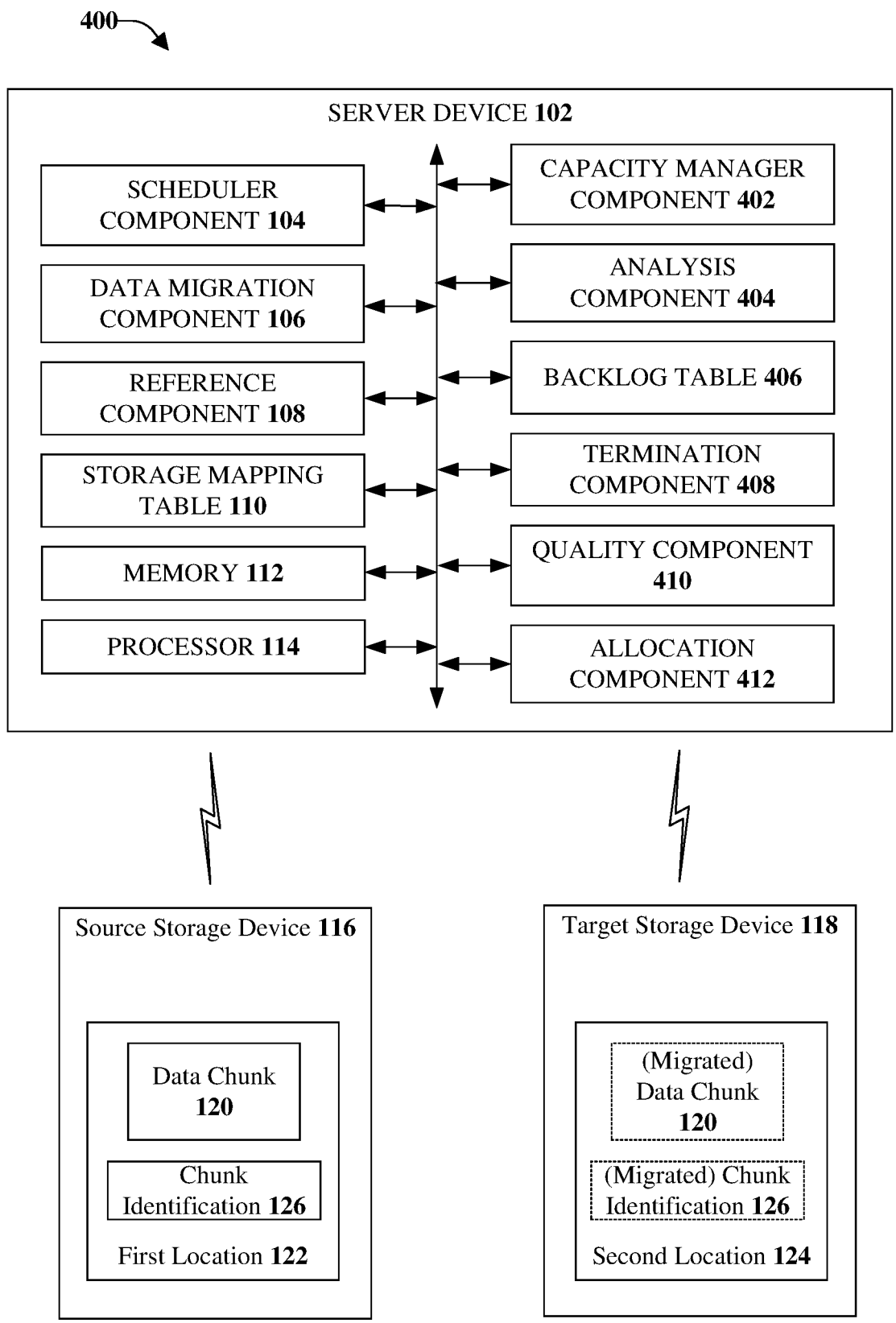
FIG. 4 illustrates another example, non-limiting, system for intra-cluster migration for elastic cloud storage in accordance with one or more embodiments described herein.

FIG. 4 illustrates another example, non-limiting, system 400 for intra-cluster migration for elastic cloud storage in accordance with one or more embodiments described herein. Repetitive description of like elements employed in other embodiments described herein is omitted for sake of brevity. The system 400 can comprise one or more of the components and/or functionality of the system 100, the system 300, and vice versa.

The server device 102 can comprise a capacity manager component 402 that can, prior to the data migration component 106 moving the data chunk 120, divide a capacity of the target storage device 118 into a set of free blocks. The data migration component 106 can move the data chunk 120 into a free block of the set of free blocks.

In another example, prior to the data migration component 106 moving the data chunk 120, an analysis component 404 can determine that the data chunk 120 comprises immutable data. However, according to some implementations, the data chunk 120 does not comprise immutable data. According to these implementations, the analysis component 404 can determine that the data chunk 120 is open for writes at the source storage device 116. Based on this determination, a reference of the data chunk 120 can be added to a backlog table 406 (e.g., a backlog data structure) and a timer (not shown) can be started by the analysis component 404 (or another system component). After a defined interval (e.g., upon expiration of the timer), if the analysis component 404 determines the data chunk 120 is still open for writes, a termination component 408 can force a closure of the data chunk 120 at the source storage device 116. Upon or after the forced closure of the data chunk, the data chunk can be migrated to the target storage device 118 as discussed herein.

According to some implementations, to move the data chunk 120 and the chunk identifier (e.g., the chunk identification 126), the data migration component 106 can eliminate repeated replication of the data chunk (as would be the case if the data was moved at the object level). In another implementation, the data migration component 106 can preserve locations of existing objects at the source storage device 116 based on movement of the data chunk 120 and the chunk identifier.

In another example, prior to the data migration component 106 moving the data chunk, the capacity manager component 402 can calculate a first amount of used capacity at the source storage device 116. Further, the capacity manager component 402 can reserve a second amount of capacity in the target storage device 118. The first amount of used capacity and the second amount of capacity can be a similar amount of capacity as determined by a similarity criterion. For example, the first amount and second amount can be a same amount, or a similar amount that is within a defined percentage of one another.

According to another example, prior to the data migration component 106 moving the data chunk 120, a quality component 410 can determine the data chunk is not consistent and can recover a consistency of the data chunk 120. Further to this example, an allocation component 412 can allocate an amount of available space in the target storage device 118. A confirmation component 414 can approve a movement of the data chunk 120 based on a determination that the amount of available space allocated in the target storage device 118 is at a sufficient level to accommodate the data chunk 120.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 5:
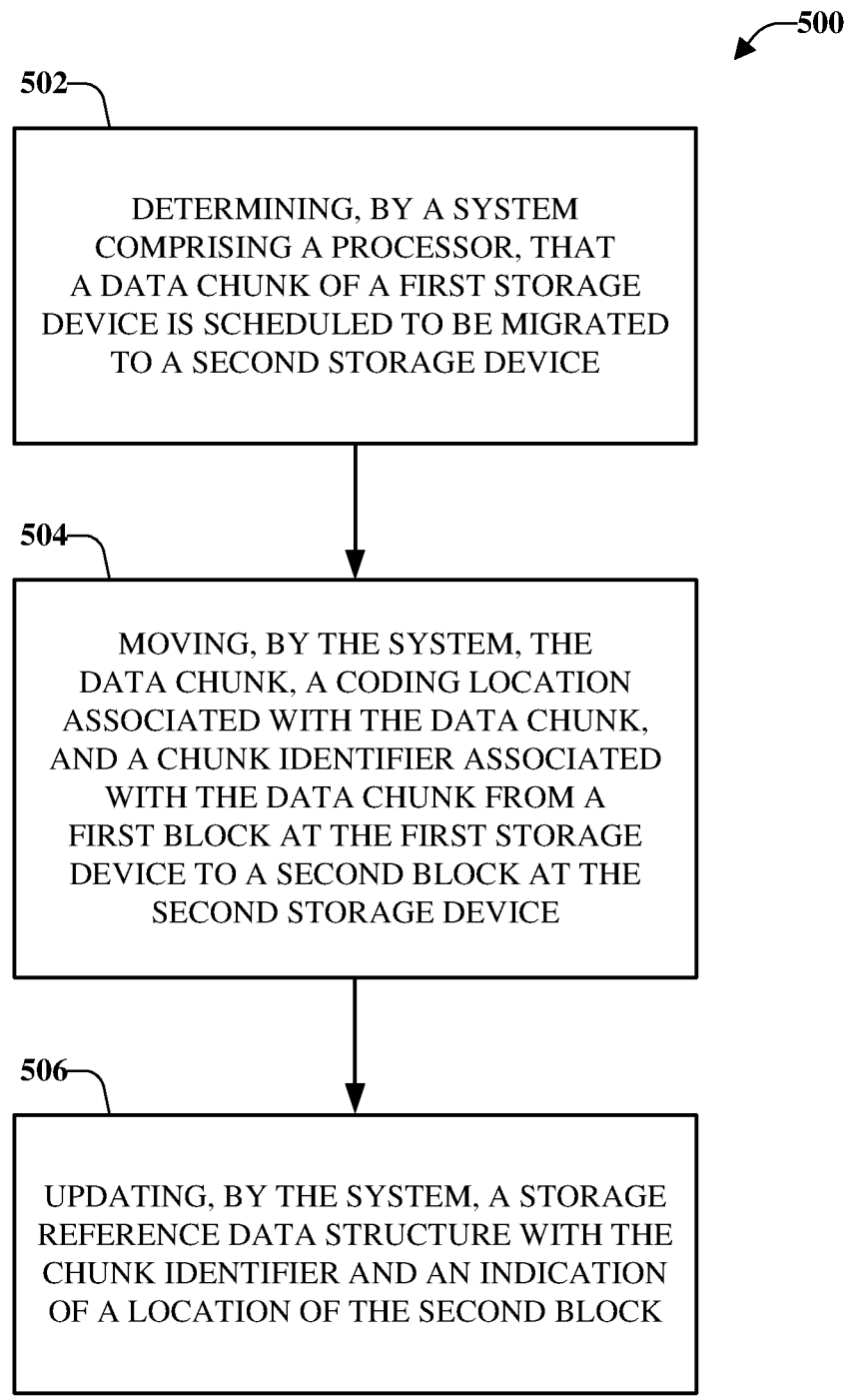
FIG. 5 illustrates a flow diagram of an example, non-limiting, computer-implemented method that facilitates intra-cluster migration in accordance with one or more embodiments described herein.

FIG. 5 illustrates a flow diagram of an example, non-limiting, computer-implemented method 500 that facilitates intra-cluster migration in accordance with one or more embodiments described herein. Repetitive description of like elements employed in other embodiments described herein is omitted for sake of brevity.

The various methods discussed herein can be utilized for a hardware upgrade that can be practical to implement. The methods can operate at the chunk level to solve the problems of repeated data replication and of creation of a large quantity of garbage to collect.

At 502 of the computer-implemented method 500, a system comprising a processor can determine that a data chunk (e.g., the data chunk 120) of a first storage device (e.g., the source storage device 116) is scheduled to be migrated to a second storage device (e.g., the target storage device 118 and via the scheduler component 104). The data chunk can be scheduled to be moved between the storage devices based on one or more new storage devices being added to the system, one or more storage devices being scheduled to be removed from the system, for load balancing, or for other reasons.

The data chunk, a coding location associated with the data chunk, and a chunk identifier (e.g., the chunk identification 126) associated with the data chunk can be moved, at 504 of the computer-implemented method 500 (e.g., via the data migration component 106). The movement can be from a first block at the first storage device to a second block at the second storage device.

Further, at 506 of the computer-implemented method 500, the system can update a storage reference data structure (e.g., the storage mapping table 110) with the chunk identifier and an indication of a location of the second block (e.g., via that reference component 108). Accordingly, the data chunk can be moved while retaining the same identifier and in a seamless manner.

Figure 6:
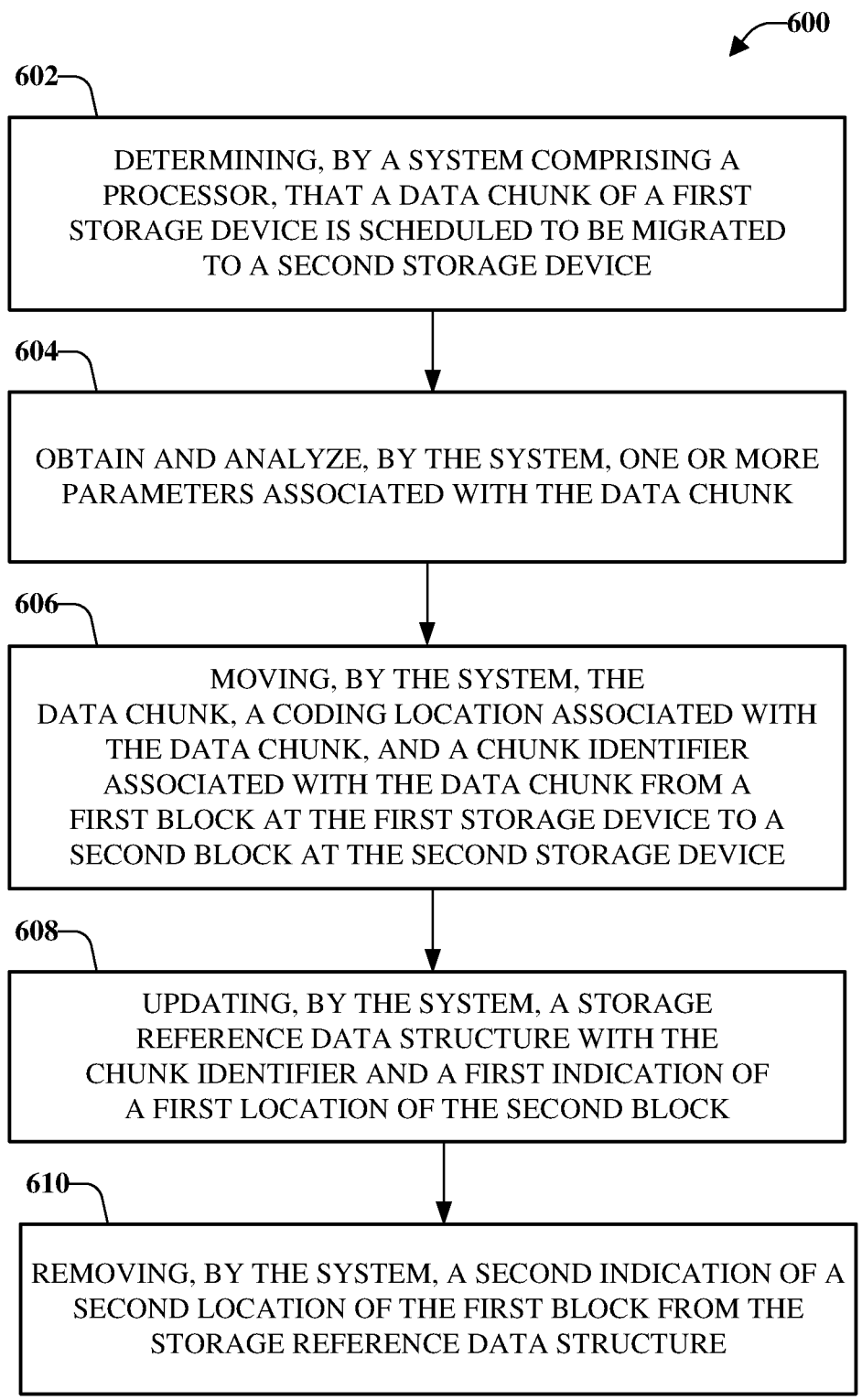
FIG. 6 illustrates a flow diagram of an example, non-limiting, computer-implemented method that facilitates updating a location reference of a data chunk based on migration of the data chunk between storage devices in accordance with one or more embodiments described herein.

FIG. 6 illustrates a flow diagram of an example, non-limiting, computer-implemented method 600 that facilitates updating a location reference of a data chunk based on migration of the data chunk between storage devices in accordance with one or more embodiments described herein. Repetitive description of like elements employed in other embodiments described herein is omitted for sake of brevity.

At 602 of the computer-implemented method 600, a determination is made that one or more data chunks (e.g., the data chunk 120) is to be moved from a first storage device (e.g., the source storage device 116) to a second storage device (e.g., the target storage device and via the scheduler component 104). Based on the determination, information related to the one or more data chunks can be obtained and analyzed by the system at 604 of the computer-implemented method 600. According to an example implementation, a capacity of the second storage device can be divided into a set of free blocks (e.g., via a capacity manager component 402). In another example implementation, it can be determined that the data chunk comprises immutable data (e.g., via the analysis component 404).

At 606 of the computer-implemented method 600, the system can move the data chunk, a coding location associated with the data chunk, and an associated chunk identifier from a first block at the first storage device to a second block in the second storage device (e.g., via the data migration component 106). The second block can be included in the set of free blocks of the second storage device.

A storage reference data structure can be updated, at 608 of the computer-implemented method 600 (e.g., via the reference component 108). For example, the storage reference data structure (e.g., the storage mapping table 110) can be updated with the chunk identifier and an indication of a location of the second block. According to some implementations, the indication of the location of the second block can be a first indication of a first location of the second block. Further to these implementations, the computer-implemented method can comprise, at 610 of the computer-implemented method 600, removing, by the system, a second indication of a second location of the first block from the storage reference data structure (e.g., via the reference component 108).

Figure 7:
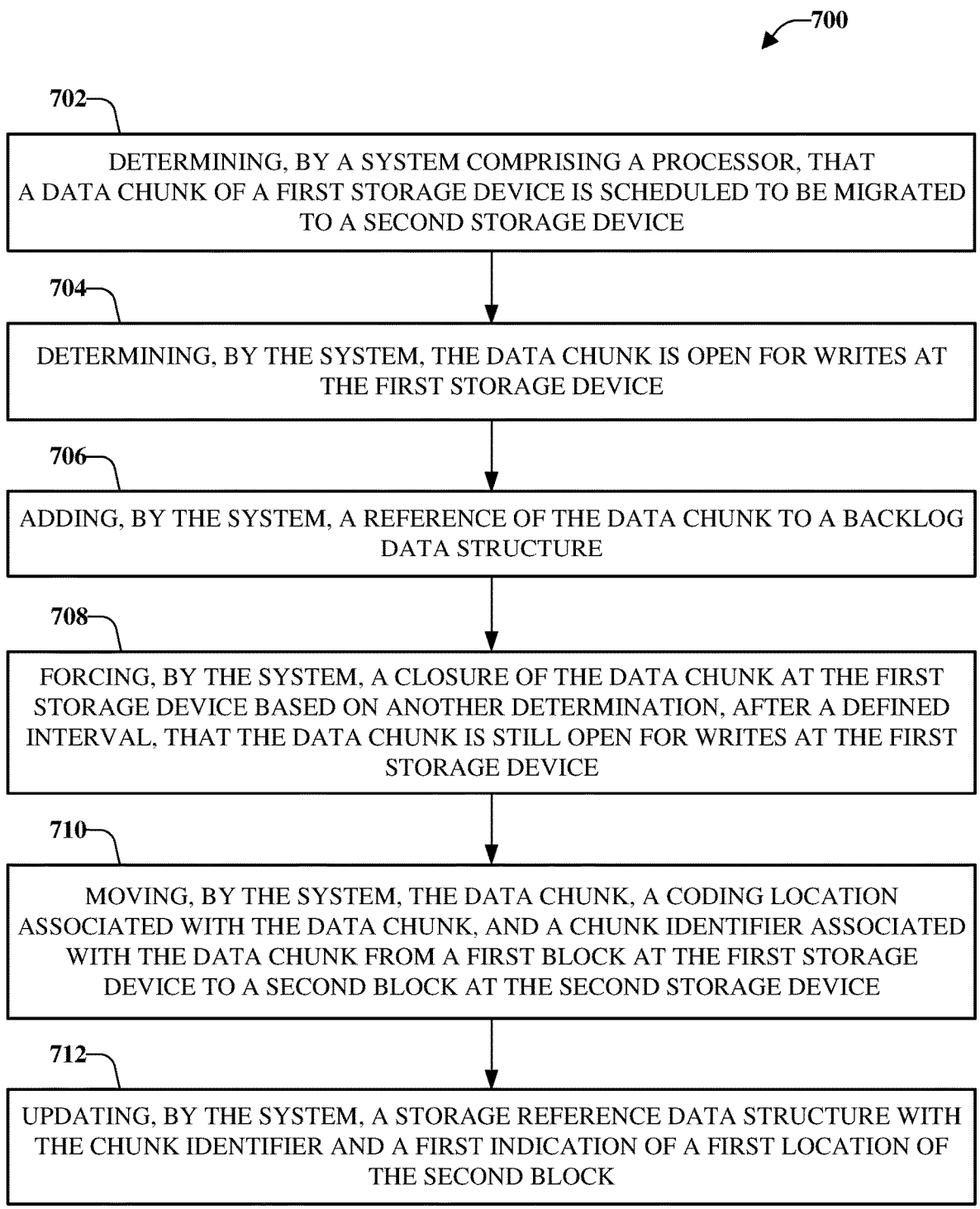
FIG. 7 illustrates a flow diagram of an example, non-limiting, computer-implemented method that facilitates allowing time for completion of writes to a data chunk and closing the data chunk after a defined interval in accordance with one or more embodiments described herein.

FIG. 7 illustrates a flow diagram of an example, non-limiting, computer-implemented method 700 that facilitates allowing time for completion of writes to a data chunk and closing the data chunk after a defined interval in accordance with one or more embodiments described herein. Repetitive description of like elements employed in other embodiments described herein is omitted for sake of brevity.

It can be determined, at 702 of the computer-implemented method 700 that a data chunk is to be migrated from a first storage device to a second storage device (e.g., via the scheduler component 104). However, the data chunk could still be in use. Thus, at 704 of the computer-implemented method 700, it can be determined that the data chunk is open for writes at the first storage device (e.g., via the analysis component 404). Accordingly, a reference of the data chunk can be added to a backlog data structure (e.g., the backlog table 406), at 706 of the computer-implemented method (e.g., via the analysis component 404). The backlog data structure can be a database of the data chunks that are scheduled to be moved but have not yet been moved.

Upon or after the reference of the data chunk is added to the backlog data structure, a timer can be started and associated with the reference. The timer can specify a defined interval, after which the data chunk should be moved. Therefore, at 708 of the computer-implemented method 700, the system can force a closure of the data chunk at the first storage device based on another determination, after a defined interval, that the data chunk is still open for writes at the first storage device (e.g., via the termination component 408).

Upon or after the forced close, at 710 of the computer-implemented method 700, the system can move the data chunk and associated information to the second storage device (e.g., via the data migration component 106). The associated information can include the coding location associated with the data chunk and the chunk identifier. A storage reference data structure can be updated, at 712 of the computer-implemented method 700 (e.g., via the reference component 108). For example, the storage reference data structure can be updated with the chunk identifier and an indication of a location of the second block in the second storage device.

Figure 8:
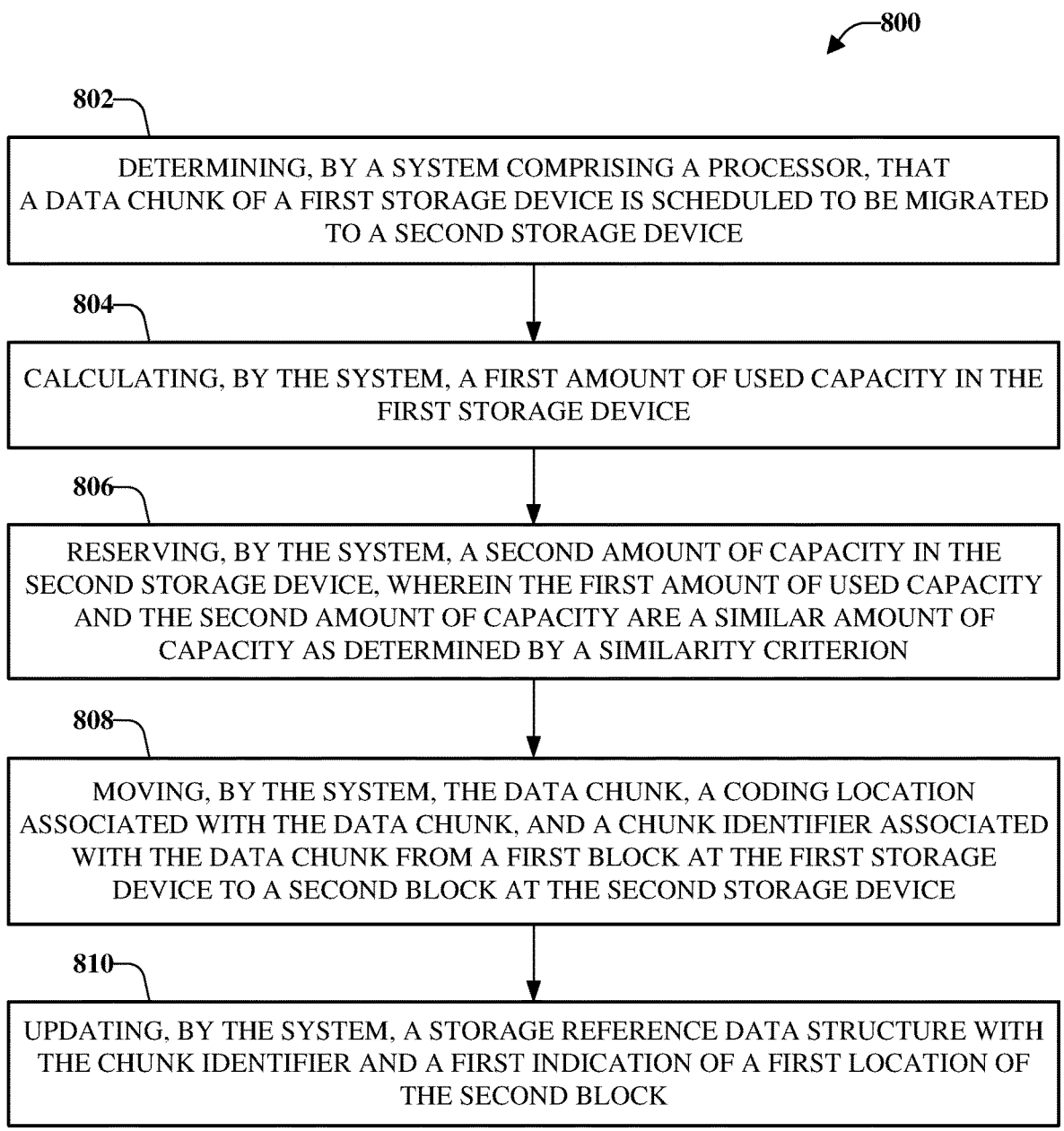
FIG. 8 illustrates a flow diagram of an example, non-limiting, computer-implemented method that facilitates reserving storage capacity for the data chunk at the target storage device in accordance with one or more embodiments described herein.

FIG. 8 illustrates a flow diagram of an example, non-limiting, computer-implemented method 800 that facilitates reserving storage capacity for the data chunk at the target storage device in accordance with one or more embodiments described herein. Repetitive description of like elements employed in other embodiments described herein is omitted for sake of brevity.

A data chunk stored on a source target device is determined to be scheduled for migration to a second target device at 802 of the computer-implemented method 800 (e.g., via the scheduler component 104). The determination can be made based on a planned movement of data between the storage devices. For example, the second storage device can be deployed as an intended replacement for the first storage device during a planned system upgrade.

Based on the determination, at 804 of the computer-implemented method 800, a first amount of used capacity in the first storage device can be calculated (e.g., via the analysis component 404). At 806 of the computer-implemented method 800, a second amount of capacity can be reserved in the second storage device (e.g., via the analysis component 404). The first amount of capacity and the second amount of capacity can be a similar amount of capacity as determined by a similarity criterion. For example, the similarity criterion can indicate that the amount of capacity should be identical, nearly identical, of a size that is within a certain range of one another, and so on.

The capacity can be reserved in the second storage device, at 808 of the computer-implemented method 800 (e.g., via the capacity manager component 402). Upon or after the capacity is reserved, the data chunk, a coding location associated with the data chunk, and a chunk identifier can be moved from a first block at the first storage device to a second block at the second storage device (e.g., via the data migration component 106). Further, at 810 of the computer-implemented method 800, a table can be updated by the system to indication the data chunk is now at the second location (e.g., via the reference component 108).

Figure 9:
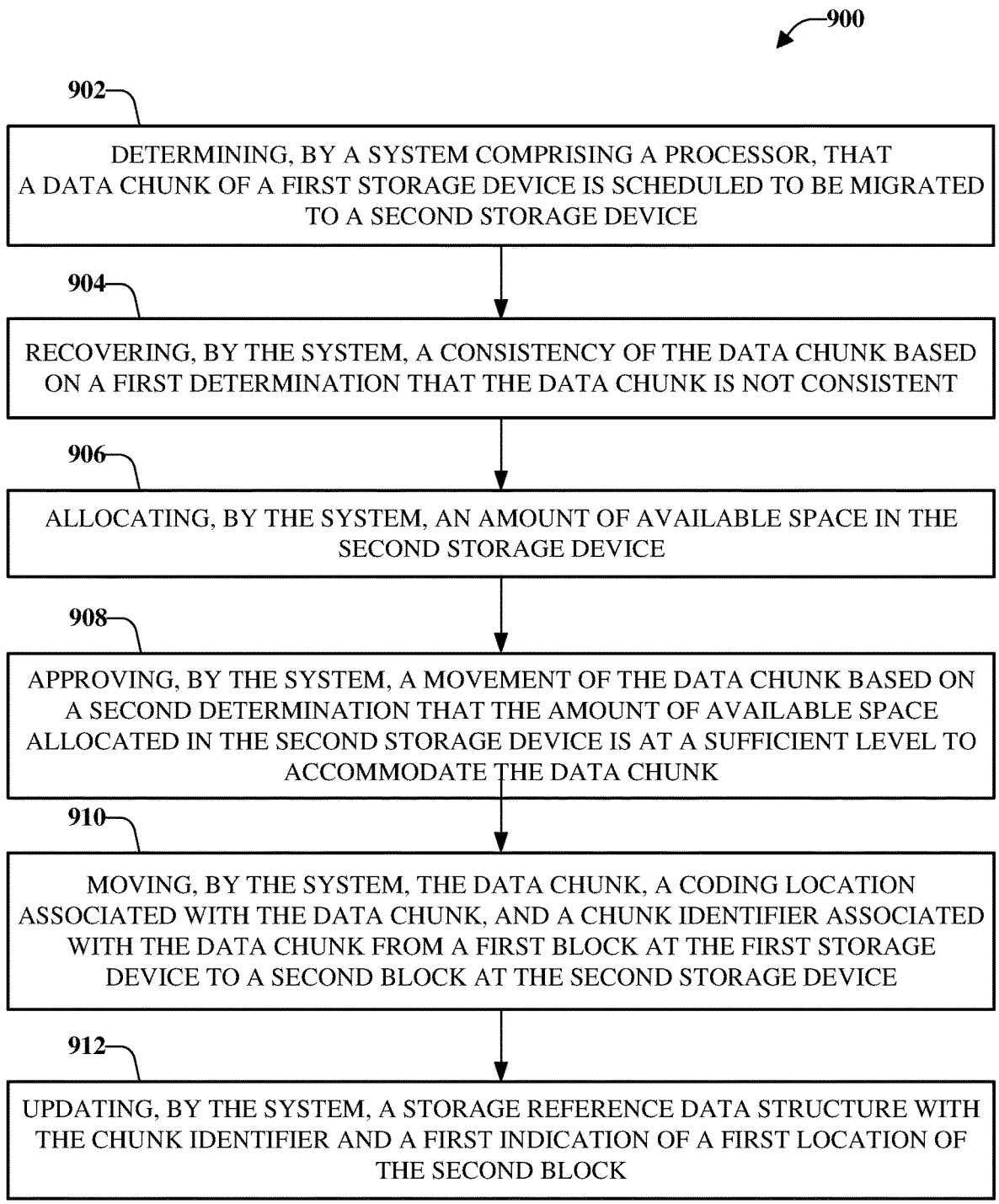
FIG. 9 illustrates a flow diagram of an example, non-limiting, computer-implemented method that facilitates ensuring a complete and accurate data chunk is moved and adequate space is available for the data chunk in accordance with one or more embodiments described herein.

FIG. 9 illustrates a flow diagram of an example, non-limiting, computer-implemented method 900 that facilitates ensuring a complete and accurate data chunk is moved and adequate space is available for the data chunk in accordance with one or more embodiments described herein. Repetitive description of like elements employed in other embodiments described herein is omitted for sake of brevity.

At 902 of the computer-implemented method 900, it can be determined that at least one data chunk is to be moved between storage devices (e.g., via the scheduler component 104). Based upon the determination, at 904 of the computer-implemented method 900, a consistency of the data chunk can be recovered based on a first determination that the data chunk is not consistent (e.g., via the quality component 410).

Further, at 906 of the computer-implemented method 900, an amount of available space at the second storage device can be allocated for the data chunk (e.g., via the allocation component 412). Upon or after allocation of the available space, at 908 of the computer-implemented method 900, a movement of the data chunk can be approved (e.g., via the confirmation component 414). The approval can be based on a second determination that the amount of available space allocated in the second storage device is at a sufficient level to accommodate the data chunk. If the level is not sufficient, another storage device that has a sufficient level of storage space can be utilized as the target storage device.

The data chunk and associated information can be moved by the system at 910 of the computer-implemented method 900 (e.g., via the data migration component 106). For example, the associated information can include a coding location associated with the data chunk and a chunk identifier. Further, at 912 of the computer-implemented method 900, a storage reference data structure can be updated with the chunk identifier and an indication of a location of the second block (e.g., via the reference component 108).

Figure 10:
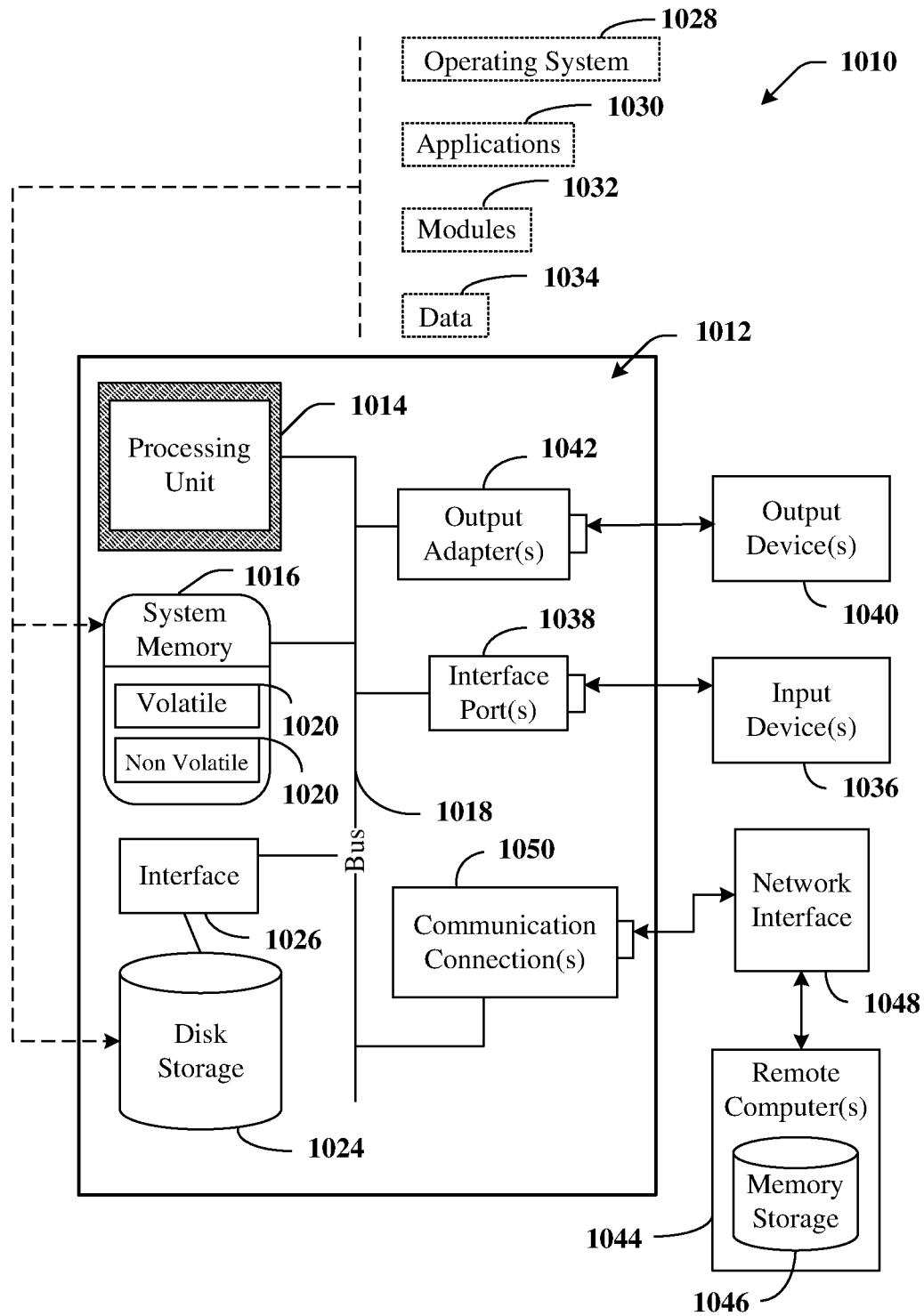
FIG. 10 illustrates an example, non-limiting, computing environment in which one or more embodiments described herein can be facilitated.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

Figure 11:
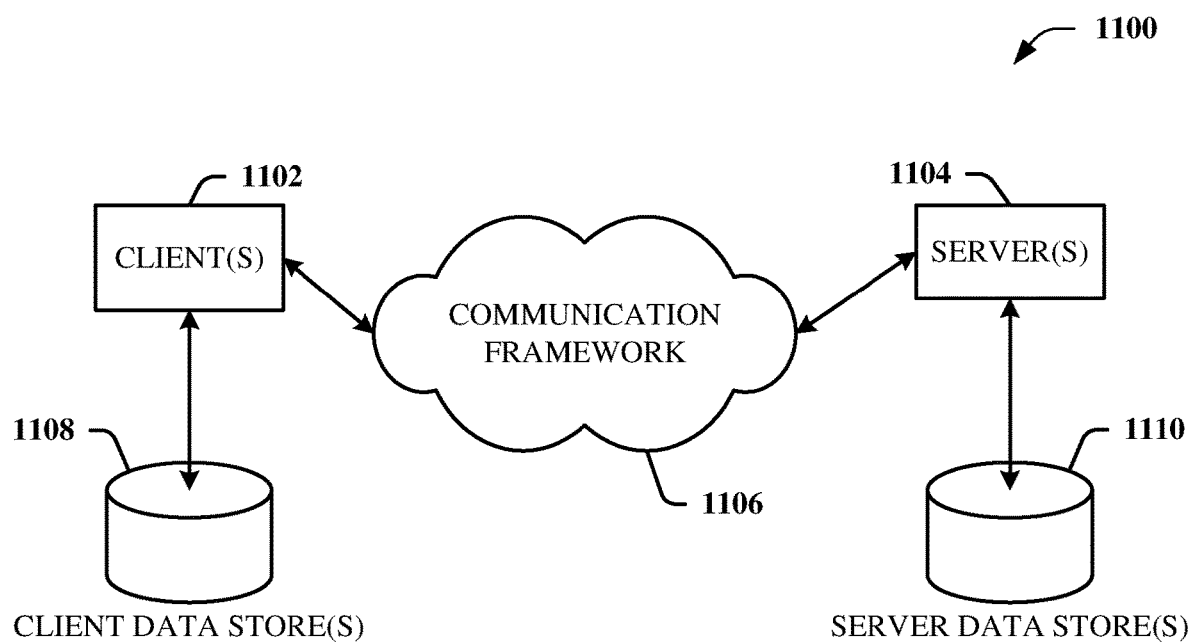
FIG. 11 illustrates an example, non-limiting, networking environment in which one or more embodiments described herein can be facilitated.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

Disclosed embodiments and/or aspects should neither be presumed to be exclusive of other disclosed embodiments and/or aspects, nor should a device and/or structure be presumed to be exclusive to its depicted element in an example embodiment or embodiments of this disclosure, unless where clear from context to the contrary. The scope of the disclosure is generally intended to encompass modifications of depicted embodiments with additions from other depicted embodiments, where suitable, interoperability among or between depicted embodiments, where suitable, as well as addition of a component(s) from one embodiment(s) within another or subtraction of a component(s) from any depicted embodiment, where suitable, aggregation of elements (or embodiments) into a single device achieving aggregate functionality, where suitable, or distribution of functionality of a single device into multiple device, where suitable. In addition, incorporation, combination or modification of devices or elements (e.g., components) depicted herein or modified as stated above with devices, structures, or subsets thereof not explicitly depicted herein but known in the art or made evident to one with ordinary skill in the art through the context disclosed herein are also considered within the scope of the present disclosure.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   ascertaining, by a system comprising a processor, that a first storage device is to be removed from service;
   determining, by the system, that a data chunk of the first storage device is scheduled to be moved to a second storage device;
   moving, by the system, the data chunk, and a chunk identifier associated with the data chunk from the first storage device to the second storage device; and
   updating, by the system, a storage reference data structure with the chunk identifier and an indication of a location of the data chunk in the second storage device, wherein the moving the data chunk and the chunk identifier comprises eliminating repeated replication of the data chunk.

2. The method of claim 1, wherein the location is a first location, wherein the indication of the location is a first indication of the first location, and wherein the method further comprises:
   removing, by the system, a second indication of a second location of the data chunk in the first storage device from the storage reference data structure.

3. The method of claim 1, further comprising:
   prior to the moving the data chunk, dividing, by the system, a capacity of the second storage device into a set of free blocks, wherein the set of free blocks comprises the location.

4. The method of claim 1, further comprising:
   prior to the moving the data chunk, determining, by the system, that the data chunk comprises immutable data.

5. The method of claim 1, further comprising:
   prior to the moving the data chunk,
   determining, by the system, the data chunk is open for writes at the first storage device,
   adding, by the system, a reference of the data chunk to a backlog data structure, and
   forcing, by the system, a closure of the data chunk at the first storage device based on another determination, after a defined interval, that the data chunk is still open for writes at the first storage device.

6. The method of claim 1, wherein the moving the data chunk and the chunk identifier comprises preserving locations of existing objects at the first storage device.

7. The method of claim 1, further comprising:
   prior to the moving the data chunk,
   calculating, by the system, a first amount of used capacity in the first storage device, and
   reserving, by the system, a second amount of capacity in the second storage device, wherein the first amount of used capacity and the second amount of capacity are a similar amount of capacity as determined by a similarity criterion.

8. The method of claim 1, further comprising:
   prior to the moving the data chunk,
   recovering, by the system, a consistency of the data chunk based on a first determination that the data chunk is not consistent,
   allocating, by the system, an amount of available space in the second storage device, and
   approving, by the system, a movement of the data chunk based on a second determination that the amount of available space allocated in the second storage device is at a sufficient level to accommodate the data chunk.

9. The method of claim 1, wherein the first storage device and the second storage device are geographically distributed devices.

10. The method of claim 1, wherein the moving the data chunk and the chunk identifier comprises avoiding a creation of a quantity of garbage for collection by a garbage collector.

11. A system, comprising:
    a processor; and
    a memory that stores executable instructions that, when executed by the processor, facilitate performance of operations, comprising:
    scheduling a migration of a data chunk from a source storage node to a target storage node based on a determination that the source storage node is scheduled to be removed from service; and
    mitigating repeated data replication of the data chunk comprising:
    facilitating the migration of the data chunk from a first location in the source storage node to a second location in the target storage node, wherein data indicative of an identity of the data chunk is migrated with the data chunk; and
    replacing the first location with the second location in a storage mapping table.

12. The system of claim 11, wherein the replacing the first location with the second location comprises:
    removing a first reference to the first location for the identity of the data chunk from the storage mapping table; and
    adding a second reference to the second location for the identity of the data chunk to the storage mapping table.

13. The system of claim 11, wherein the operations further comprise:
    prior to the facilitating the migration of the data chunk, dividing a storage capacity of the target storage node into a set of free blocks, wherein the first location is included in a block of the set of free blocks.

14. The system of claim 11, wherein the operations further comprise:
    prior to the facilitating the migration of the data chunk, determining the data chunk is sealed and comprises immutable data.

15. The system of claim 11, wherein the operations further comprise:
prior to the facilitating the migration of the data chunk,
performing a first determination that the data chunk is open for writes at the source storage node;
performing a second determination that the data chunk is open for writes at the source storage node after a defined interval measured from the first determination; and
causing, at the source storage node, a forced closure of the data chunk based on the second determination.

16. The system of claim 11, wherein the operations further comprise facilitating a processing efficiency based on the migration of the data chunk and data indicative of the identity of the data chunk at a chunk level as compared to movement of data at an object level.

17. The system of claim 11, wherein the source storage node and the target storage node are storage devices of an elastic cloud storage system.

18. A computer-readable storage medium comprising instructions that, in response to execution, cause a system comprising a processor to perform operations, comprising:
determining a data chunk is to be migrated from a first storage node device to a second storage node device based on an elimination of the first storage node device; and
eliminating repeated replication of the data chunk based on a movement of the data chunk and information indicative of an identity of the data chunk from a first location to a second location, wherein the eliminating comprises:
moving the data chunk and information indicative of the identity of the data chunk from the first storage node device to the second storage node device; and
updating a location of the data chunk in a chunk manager data structure from the first location in the first storage node device to the second location in the second storage node device.

19. The computer-readable storage medium of claim 18, wherein the operations further comprise preserving locations of existing objects at the first storage node device after the moving the data chunk.

20. The computer-readable storage medium of claim 18, wherein the moving the data chunk and the information indicative of the identity of the data chunk comprises mitigating an amount of garbage collected during a garbage collection process.

* * * * *